US008454086B2

(12) United States Patent  (10) Patent No.: US 8,454,086 B2
Kim  (45) Date of Patent: Jun. 4, 2013

(54) ANGLE ADJUSTER FOR BICYCLE SEAT (76) Inventor: Chun Choo Kim, Seoul (KR)

( * ) Notice: Subject to any disclaimer, the term of this patent is extended or adjusted under 35 U.S.C. 154(b) by 335 days.

(21) Appl. No.: 12/881,159

(22) Filed: Sep. 13, 2010

(65) Prior Publication Data

US 2011/0221245 A1  Sep. 15, 2011

(30) Foreign Application Priority Data

Nov. 24, 2009 (KR) .................. 10-2009-0114089

(51) Int. Cl.
*B62J 1/00* (2006.01)
*B62J 1/02* (2006.01)

(52) U.S. Cl.
USPC .................... 297/215.15; 297/209

(58) Field of Classification Search
USPC ............................ 297/215.5, 209
See application file for complete search history.

(56) References Cited

U.S. PATENT DOCUMENTS

| | | | | |
|---|---|---|---|---|
| 4,807,856 A | * | 2/1989 | Teckenbrock | 267/132 |
| 5,048,891 A | * | 9/1991 | Yach | 297/215.14 |
| 5,921,625 A | * | 7/1999 | Muser | 297/215.15 |
| 6,561,579 B1 | * | 5/2003 | Weir | 297/195.1 |
| 7,267,401 B2 | * | 9/2007 | Bertelloni | 297/195.1 |
| 2002/0166941 A1 | * | 11/2002 | Dunlap | 248/599 |
| 2004/0208687 A1 | * | 10/2004 | Sicz et al. | 403/109.3 |
| 2005/0200170 A1 | * | 9/2005 | Liao | 297/215.15 |
| 2006/0175792 A1 | * | 8/2006 | Sicz et al. | 280/200 |

FOREIGN PATENT DOCUMENTS

| | | |
|---|---|---|
| JP | 11-301542 | 11/1999 |
| KR | 10-1999-0030387 | 4/1999 |
| KR | 20-0222176 | 5/2001 |
| KR | 10-2009-0085900 | 8/2009 |

* cited by examiner

*Primary Examiner* — Sarah B McPartlin
(74) *Attorney, Agent, or Firm* — Christopher Paul Mitchell (57) ABSTRACT

An angle adjuster for a bicycle seat that is disposed between a frame of a vehicle and a seat. The angle adjuster for a bicycle seat includes: a frame connector configured to be connected to the frame; a seat connector rotatably connected to the upper end of the frame connector and configured to support seat; an angle adjusting assembly including a main clutch fixing and releasing the frame connector and the seat connector, and controlling rotational angle of the seat connector with respect to the frame connector by the release operation of the main clutch; an operating lever configured to mount on the frame to operate the main clutch; and a wire connecting the main clutch with the operating lever and operating the main clutch, when the operating lever is operated.

6 Claims, 10 Drawing Sheets

ANGLE ADJUSTER FOR BICYCLE SEAT

RELATED APPLICATIONS

This application claims priority under 35 U.S.C. 119(e) from Korean Patent Application No. 10-2009-0114089, filed Nov. 24, 2009 in the Korean Intellectual Property Office, which is incorporated herein by reference in its entirety.

TECHNICAL FIELD

Embodiments of the present invention relate to an angle adjuster for a bicycle seat, and in more detail, an angle adjuster for a bicycle seat that allows a user to maintain a stable position by adjusting the angle and height of the seat while the bicycle travels.

DESCRIPTION OF RELATED ART

In general, a bicycle is a vehicle that a user rides by rotating the wheels of the bicycle with two legs while the user sits on the seat with the user's hands holding the handlebars. The user alternatively pushes the pedals with the user's two legs such that a wheel is rotated by a chain. Although there are usually two wheels, there may be one, three, or even more wheels. Such human-powered bicycles have been widely used as a typical means of transportation, and particularly, have been recently applied in various fields, such as sport outfits for improving health and recreation. Further, demand is increasing for the environmentally-friendly features of bicycles.

The structure of bicycles of the related art typically includes: a front wheel and a rear wheel that rotate on the ground to move the bicycle; a frame that has handlebars steering the front wheel at the front upper portion and supporting the front wheel, and the rear wheel to be rotatable; pedals that are linked with the rear wheel by a chain to rotate the rear wheel; and a seat assembly that is mounted at the rear upper portion of the frame for a user to ride.

Further, there have been bicycles equipped with a height adjuster to adjust height of a seat to fit the height of a user.

However, the seats were fixed perpendicularly to the frame of the bicycles in the bicycles of the related art, such that it was difficult to adjust angle of the seats to fit the user's body shape and riding position. That is, since the angle of the seat were fixed, it was difficult to satisfy all of users having various body shapes. Further, the user's position inclines forward or backward from the bicycles, when the user goes up or comes down a slope with the bicycles, in which since the angle of the seats is fixed, the user has difficulty in maintaining a comfortable position, thereby increasing the chance of an accident.

Therefore, the applicant(s) has made an application of an angle adjuster for a bicycle seat in order to overcome the problems, which is disclosed in Korean Patent Publication No. 2009-0085900, titled "Angle adjusting device for bicycle saddle". However, according to the related art, users have to directly operate a hinge unit of an angle adjuster under the seat to adjust angle of the seat, such that it was difficult to adjust the angle of the seat while the bicycles run.

SUMMARY

Embodiments of the present invention address the problems of the related art and it is an aspect of the present invention to provide an angle adjuster for a bicycle seat that allows users to ride a bicycle in a stable position by adjusting the angle of the seat to fit the body shapes of various users, and to easily correct the position by adjusting the angle of the seat in accordance with the riding conditions of the user, by using an operating lever even when the bicycle is in motion.

Further, it is another aspect of the present invention to provide an angle adjuster for a bicycle seat that makes it possible to adjust the height of the seat in accordance with riding conditions of the user while the bicycle is in motion.

In order to achieve the above and other aspects of the present invention, an angle adjuster for a bicycle seat is provided that is configured to be installed between a frame of a bicycle and a seat. The angle adjuster includes: a frame connector configured to be connected to the frame; a seat connector rotatably connected to the upper end of the frame connector and configured to support the seat; an angle adjusting assembly including a main clutch fixing and releasing the frame connector and the seat connector, and controlling rotational angle of the seat connector with respect to the frame connector by the release operation of the main clutch; an operating lever configured to mount on the frame to operate the main clutch; and a wire connecting the main clutch with the operating lever and operating the main clutch, when the operating lever is operated.

Further, the angle adjusting assembly includes: a main clutch including a first adjusting member that has a plurality of first teeth at one side and is fixed to the frame connector and a second adjusting member that has a plurality of second teeth configured to engage with the first teeth of the first adjusting member and is fixed to the seat connector; and a clutch control shaft that is fixed to any one of the first adjusting member and the second adjusting member and connected to the wire to engage or disengage the first adjusting member and the second adjusting member, when the operating lever is operated.

Further, the angle adjuster for a bicycle seat further includes a sub-clutch including a third adjusting member that has a plurality of third teeth and is fixed to the seat connector and a fourth adjusting member that has a plurality of fourth teeth configured to engage with the third teeth of the third adjusting member and is fixed to the frame connector, in which any one of the third adjusting member and the fourth adjusting member of the sub-clutch is fixed to the clutch control shaft, and the third adjusting member and the fourth adjusting member are controlled to be engaged or disengaged by the clutch control shaft.

Further, the angle adjuster for a bicycle seat further includes an elastic member disposed between the main clutch and the sub-clutch to provide elastic force such that the first adjusting member and the second adjusting member, and the third adjusting member and the fourth adjusting member are engaged each other.

Further, the angle adjuster for a bicycle seat further includes: a seat support shaft configured to support the seat, reciprocating in the seat connector, and having a plurality of locking grooves formed in the longitudinal direction of the shaft; a support spring configured to elastically support the seat support shaft such that the seat is spaced apart from the seat connector; a locking member selectively locked in the locking grooves to control height of the seat support shaft; a sub-operating lever configured to be mounted on the frame operating the locking member; and a sub-wire connecting the locking member with the sub-operating lever and operating the locking member, when the sub-operating lever is operated.

Further, the angle adjuster for a bicycle seat further includes a sub-elastic member disposed between the seat connector and the locking member to provide elastic force such that the locking member is locked in any one of the locking grooves.

Further, the angle adjuster for a bicycle seat further includes: a plurality of locking grooves formed in the longitudinal direction of the frame connector and configured to be received in the frame; a support spring configured to elastically support the frame connector such that the frame connector is spaced apart from the frame; a locking member configured to be selectively locked in the locking grooves to control height of the frame connector with respect to the frame; a sub-operating lever configured to be mounted on the frame operating the locking member; and a sub-wire connecting the locking member with the sub-operating lever and operating the locking member, when the sub-operating lever is operated.

Further, the angle adjuster for a bicycle seat further includes a sub-elastic member configured to be disposed between the frame and the locking member to provide elastic force such that the locking member is locked in any one of the locking grooves.

As described above, an angle adjuster for a bicycle seat according to an embodiment of the present invention makes it possible to adjust angle of the seat to fit the body shapes of users such that they may ride the bicycle in a comfortable position. Further, it is possible to prevent an accident by appropriately adjusting angle of the seat such that the user's body is not inclined in one direction, when going up or coming down a slope. In particular, it is possible for a user to freely adjust the angle and height of the seat by operating the operating lever while the bicycle is in motion, thereby providing users with convenience.

The foregoing and other aspects will become apparent from the following detailed description when considered in conjunction with the accompanying drawing figures.

DETAILED DESCRIPTION

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures. As used in the description of this application, the terms "a", "an" and "the" may refer to one or more than one of an element (e.g., item or act). Similarly, a particular quantity of an element may be described or shown while the actual quantity of the element may differ. The terms "and" and "or" may be used in the conjunctive or disjunctive sense and will generally be understood to be equivalent to "and/or". Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present.

Figure 1:
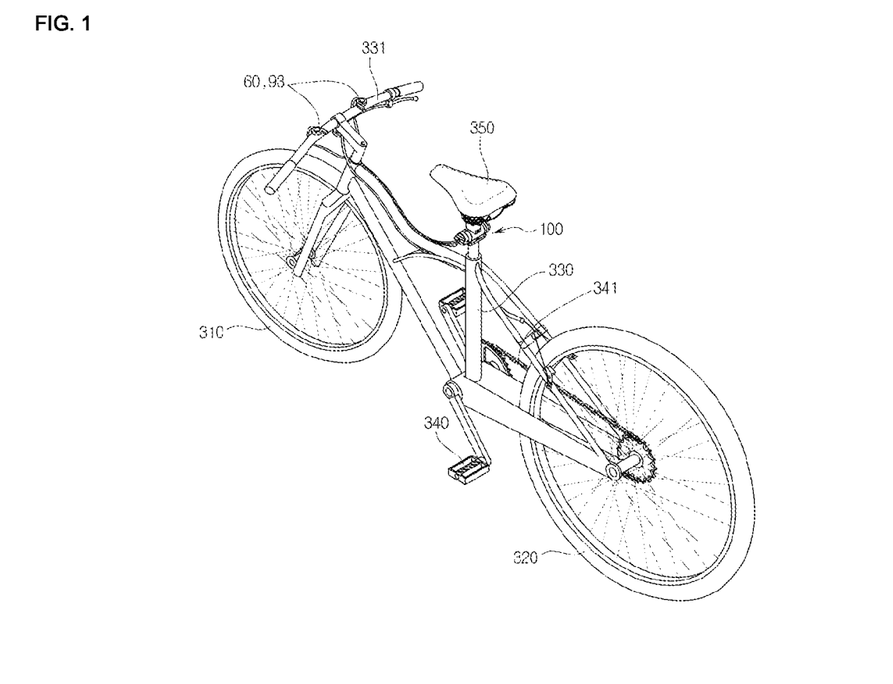
FIG. 1 is a view showing a bicycle equipped with an angle adjuster for a bicycle seat according to a first embodiment of the present invention.
Figure 2:
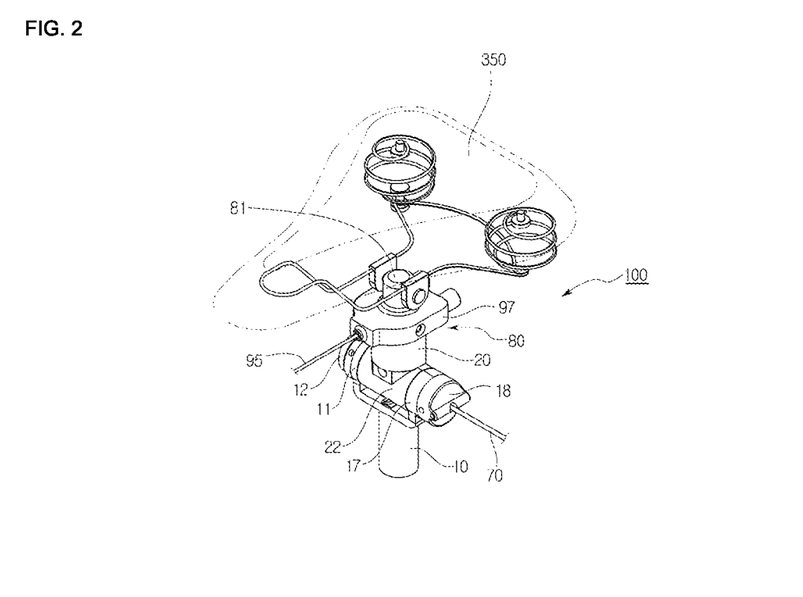
FIG. 2 is a perspective view showing the structure of the angle adjuster for a bicycle seat according to the first embodiment of the present invention.
Figure 3:
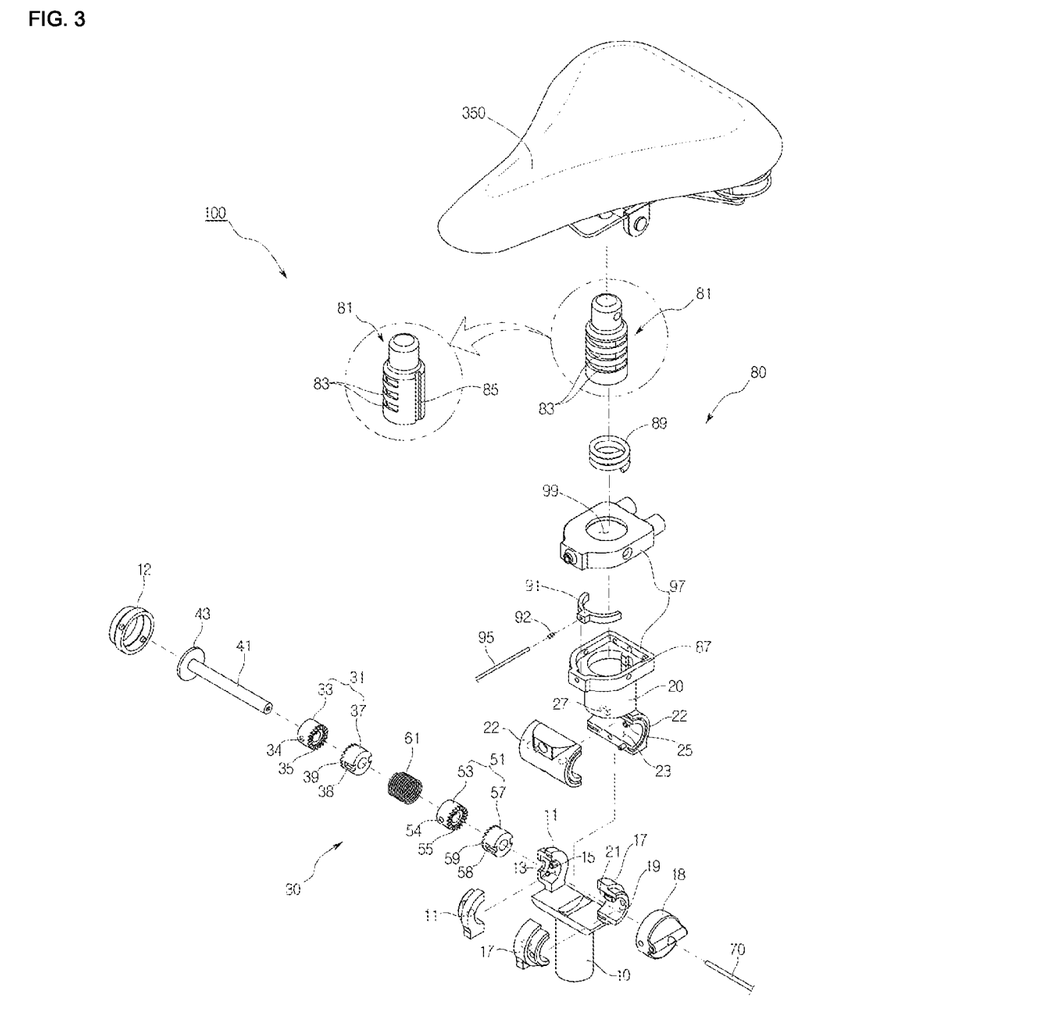
FIG. 3 is an exploded perspective view showing the structure of the angle adjuster for a bicycle seat according to the first embodiment of the present invention.

FIG. 1 is a view showing a bicycle equipped with an angle adjuster for a bicycle seat according to a first embodiment of the present invention, FIG. 2 is a perspective view showing the structure of the angle adjuster for a bicycle seat according to the first embodiment of the present invention, and FIG. 3 is an exploded perspective view showing the structure of the angle adjuster for a bicycle seat according to the first embodiment of the present invention.

Referring to FIGS. 1 to 3, a bicycle equipped with an angle adjuster for a bicycle seat according to a first embodiment of the present invention may include: a front wheel 310 and a rear wheel 320 that rotate on the ground to move the bicycle; a frame 330 that has handlebars steering the front wheel 310 at the front upper portion and supporting the front wheel 310 and the rear wheel 320 to be rotatable; pedals 340 that are linked with the rear wheel 320 by a chain 341 to rotate the rear wheel 320; a seat 350 that is mounted at the rear upper portion of the frame 330 for a user to ride; and an angle adjuster for a seat 100 that is disposed between the frame 330 and the seat 350 and makes it possible to adjust angle of the seat 350 by an operating lever 60 mounted on the frame 330.

In this configuration, the angle adjuster for a bicycle seat 100 according to the first embodiment may include: a frame connector 10 connected to the frame 350; a seat connector 20 connected to the upper end of the frame connector 10 to support the seat 350; an angle adjusting assembly 30 controlling the rotational angle of the seat connector 20 by using clutches 31, 51; the operating lever 60 operating the clutches 31, 51; and a wire 70 connecting the clutches 31, 51 with the operating lever 70.

The frame connector 10 may be connected to the frame 330 of the bicycle which is disposed under the seat 350 and may have a hinge structure together with the seat connector 20 and the angle adjusting assembly 30 such that the seat connector 20 is rotatably connected to the upper end. That is, a first housing 11 and a second housing 17 covering the angle adjusting assembly 30, which may function as a shaft, may be disposed at both sides of the upper end of the frame connector 10 and the seat connector 20 may be rotatably connected to the angle adjusting assembly 30, which may be disposed through the first housing 11 and the second housing 17.

In this configuration, a first receiving groove 13 that receives one end of the angle adjusting assembly 300 may be formed on the inner side of the first housing 11 and a fixing protrusion 15 that is fitted in the angle adjusting assembly 30 may be formed in the first receiving groove 13. Further, a second receiving groove 19 that receives the other end of the angle adjusting assembly 30 may be formed on the inner side of the second housing 17 and a guide protrusion 21 that is fitted and guided in the angle adjusting assembly 30 may be formed in the second receiving groove 19.

Further, the first housing 11 and the second housing 17 of the frame connector 10 may be provided with a pair of covers 12, 18 that finish the first receiving groove 13 and the second receiving groove.

The seat connector 20 may support the seat 350 under the seat 350 and may be rotatably connected to the upper end of the frame connector 10 by a third housing 22. The third housing 22 may have a third receiving groove 23 to cover the angle adjusting assembly 30 disposed in the first housing 11 and the second housing 17 of the frame connector 10, and a fixing protrusion 25 and a guide protrusion 27 which may be fitted in the angle adjusting assembly 30 may be formed in the third receiving groove 23.

The angle adjusting assembly 30 may be received in the first housing 11 and the second housing 17 of the frame connector 10 and the third housing 22 of the seat connector 20, may include one or more clutches 31, 51 that may fix and release the frame connector 10 and the seat connector 20, and may control the rotational angle of the seat connector 20 with respect to the frame connector 10 by the release operation of the clutches 31, 51.

The angle adjusting assembly 30 may include: a main clutch 31 that may have a first adjusting member 33 having a plurality of first teeth 35 at one side and may be fixed to the frame connector 10 and a second adjusting member 37 having a plurality of second teeth 39 that may engage with the first teeth 35 of the first adjusting member 33 and may be fixed to the seat connector 20; and a clutch control shaft 41 that may be fixed to any one of the first adjusting member 33 and the second adjusting member 37 of the main clutch 31 and connected to the wire 70 to engage or disengage the first adjusting member 33 and the second adjusting member 37 by the operation of the operating lever 60.

In this configuration, the clutch control shaft 41 may have one end with a press plate 43 and the other end fixed to the wire 70 connected with the operating lever 60, and may be disposed through the first receiving groove 13 and the second receiving groove 19 of the frame connector 10 and the third receiving groove 23 of the seat connector.

The first adjusting member 33 may have a fixing groove 34 formed in the outer circumference which may be fitted on the fixing protrusion 15 in the first receiving groove 13 of the first housing 11, and may be rotatably fitted on the clutch control shaft 41.

The second adjusting member 37 may have a long guide groove 38 in the outer circumference to be able to slide along the guide protrusion 27 in the third receiving groove 23 of the third housing 22, and may be integrally fixed to the clutch control shaft 41.

Further, the angle adjusting assembly 30 further may include a sub-clutch 51 that may include a third adjusting member 53 having a plurality of third teeth 55 at one side and may be fixed to the seat connector 20 and fourth adjusting member 57 having a plurality of fourth teeth 59 that may engage with the third teeth 55 of the third adjusting member 53 and may be fixed to the frame connector 10.

The third adjusting member 53 may have a fixing groove 54 in the outer circumference which may be fitted on the fixing protrusion 25 in the third receiving groove 23 of the third housing 22, and may be rotatably fitted on the clutch control shaft 41.

The fourth adjusting member 57 may have a long guide groove 58 in the outer circumference to be able to slide along the guide protrusion 21 in the second receiving groove 19 of the second housing 17, and may be integrally fixed to the clutch control shaft 41.

According to the configuration described above, the main clutch 31 and the sub-clutch 51 may be arranged in parallel on the clutch control shaft 41, the first adjusting member 33 and the second adjusting member 37 of the main clutch 31 may be arranged to face each other on the clutch control shaft 41 such that the first teeth 35 of the first adjusting member 33 may be engaged with the second teeth 39 of the second adjusting member 37. Further, the third adjusting member 53 and the fourth adjusting member 57 of the sub-clutch 51 may also be arranged to face each other on the clutch control shaft 41 such that the third teeth 55 of the third adjusting member 53 may be engaged with the fourth teeth 59 of the fourth adjusting member 57. Therefore, as the operating lever 60 is operated, the clutch control shaft 41 connected to the wire 70 may reciprocate the second adjusting member 37 and the fourth adjusting member 57, which may be integrally fixed to the clutch control shaft 41, such that the first adjusting member 33, the second adjusting member 37, the third adjusting member 53, and the fourth adjusting member 57 may be engaged or disengaged.

Further, it may be possible to disengage the first adjusting member 33, the second member 37, the third adjusting member 53, and the fourth adjusting member 57 by pressing the press plate 43 of the clutch control shaft 41 such that the clutch control shaft 41 moves, without operating the operating lever 60.

Furthermore, an elastic member 61 may be disposed between the main clutch 31 and the sub-clutch 51 to engage the first adjusting member 33 with the second adjusting member 37 and the third adjusting member 53 with the fourth adjusting member 57.

In other words, the elastic member 61 may be fitted around the clutch control shaft 41 between the main clutch 31 and the sub-clutch 51 and may elastically return and engage the first adjusting member 33, the second adjusting member 37, the third adjusting member 53, and the fourth adjusting member 57, which may have been disengaged by the operation of the operating lever 60.

The operating lever 60 may be mounted on the frame 330 of the bicycle to operate the main clutch 31 and the sub-clutch 51. That is, the operating lever 60 may be operated to move the clutch control shaft 41 forward or backward such that the main clutch 31 and the sub-clutch 51 may be respectively engaged or disengaged. In this configuration, it may be preferable that the operation lever 60 may be installed on the handlebars 332 of the frame 330 of the bicycle to provide the user with operational convenience.

The wire 70 may connect the clutch control shaft 41 controlling the main clutch 31 and the sub-clutch 51 with the operating lever 60 and may operate the main clutch 31 and the sub-clutch 51 by moving the clutch control shaft 41 forward or backward, when the user operates the operating lever 60.

Meanwhile, the angle adjuster for a bicycle seat 100 according to the first embodiment of the present invention may further include a height adjusting assembly 80 that may make it possible to adjust height of the seat 350.

The height adjusting assembly 80 may be composed of a seat support shaft 81 that may support the seat 350 of the bicycle, may reciprocate in the seat connector 20, and may have a plurality of locking grooves 83 formed in the longitudinal direction of the shaft, a support spring 89 that may elastically support the seat support shaft 81 such that the seat 350 of the bicycle may be spaced apart from the seat connector 20, a locking member 91 that may be selectively locked in the locking grooves 83 of the seat support shaft 81 to control height of the seat support shaft 81, a sub-operating lever 93 that may be mounted on the frame 330 of the bicycle and may operate the locking member 91, and a sub-wire 95 that may connect the locking member 91 with the sub-operating lever 93 and may operate the locking member 91, when the sub-operating lever 93 may be operated.

A case 97 that may receive the locking member 91 may be disposed at the upper end of the seat connector 20 and the seat support shaft 81 may protrude through a through-hole 99 formed through the case 97.

Further, a guide rail 87 may be vertically formed inside the seat connector 20 where the seat support shaft 81 may be received and a rail groove 85 corresponding to the guide rail 87 may also be formed on the seat support shaft 81, such that they may be combined. That is, the seat support shaft 81 may ascend/descend in a predetermined direction along the guide rail 87 of the seat connector 20 which may be fitted in the rail groove 85.

According to the configuration described above, the support spring 89 received in the seat connector 20 may elastically support the seat support shaft 81 supporting the seat 350 and the locking member 91 in the case 97 may be locked in the locking groove 83 of the seat support shaft 81, such that the height of the seat support shaft 81 may be fixed. In this structure, the height of the seat support shaft 81 may be adjusted by operating the sub-operating lever 93 such that the locking member 91 connected with the sub-wire 95 may move forward or backward and the locking member 91 may be selectively locked in the locking groove 83 of the seat support shaft 81.

Further, a sub-elastic member 92 may be disposed between the locking member 91 and the case 97 of the seat connector 20 to provide elastic force such that the locking member 91 may be locked in any one of the locking grooves 83 of the seat support shaft 81.

The operation of the angle adjuster for a bicycle seat having the above configuration according to the first embodiment of the present invention is described hereafter.

Figure 4:
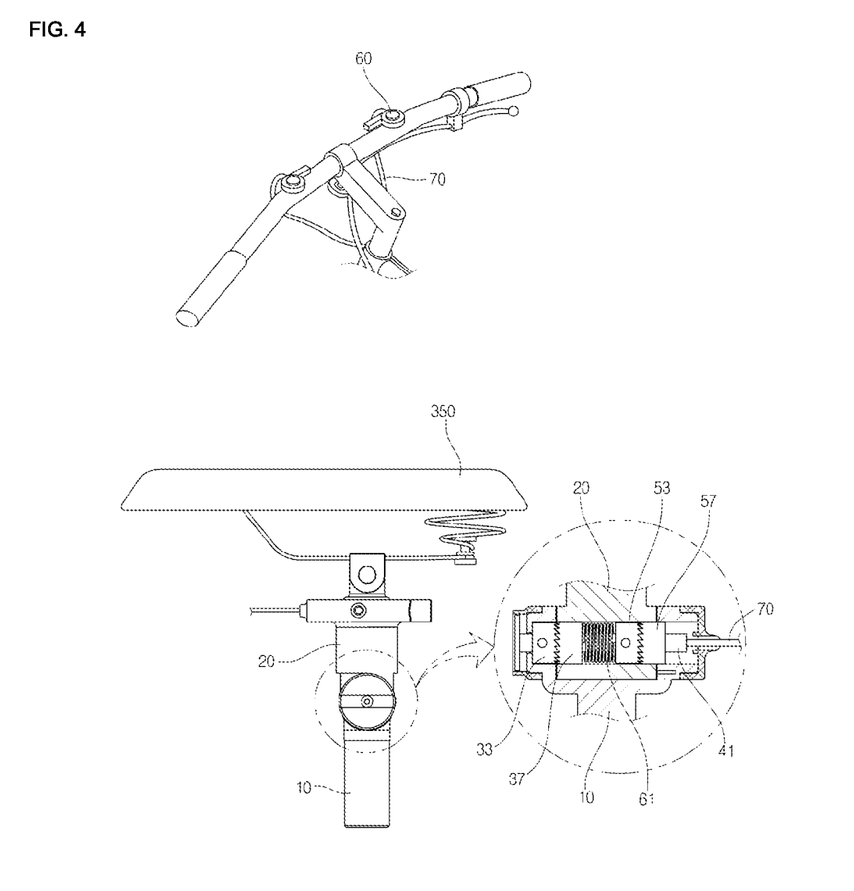
FIGS. 4 to 6 are views illustrating the angle adjustment operation of the angle adjuster for a bicycle seat according to the first embodiment of the present invention.
Figure 5:
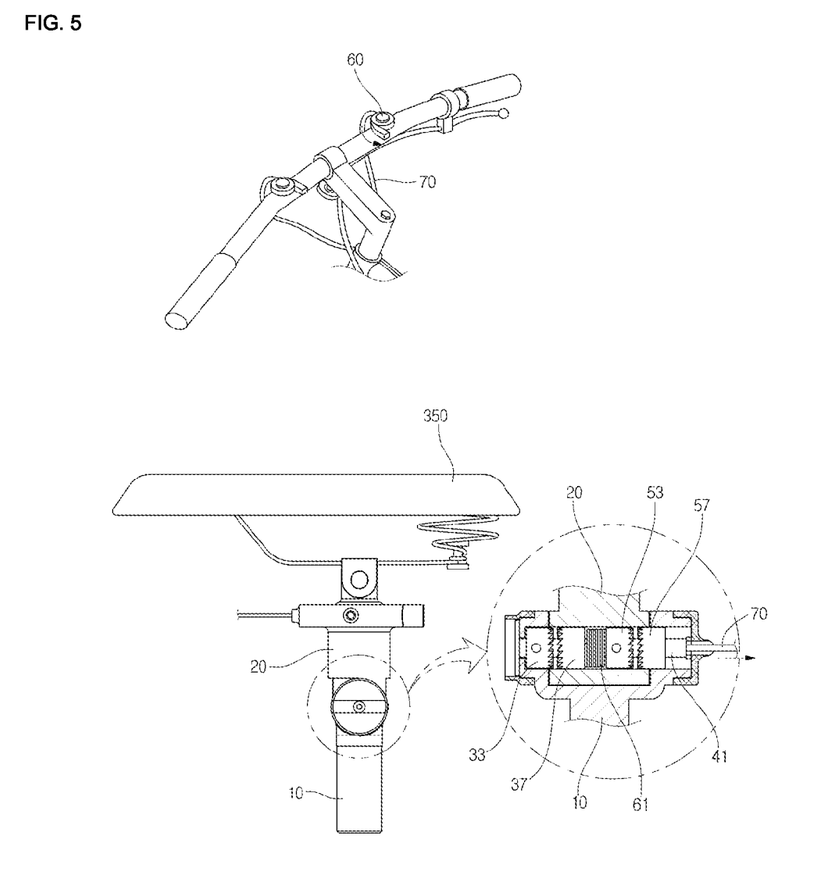
Figure 6:
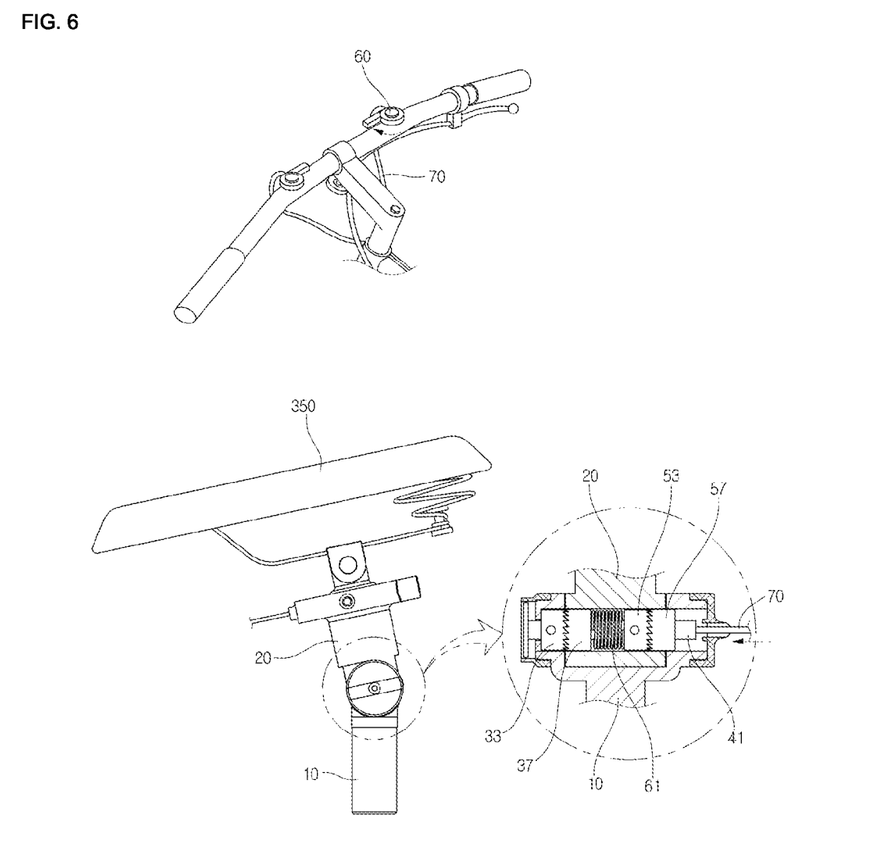

FIGS. 4 to 6 are views illustrating the angle adjustment operation of the angle adjuster for a bicycle seat according to the first embodiment of the present invention.

As shown in FIG. 4, when the operating lever 60 is not operated by a user, the first adjusting assembly 33 fixed to the frame connector 10 and the second adjusting assembly 37 fixed to the seat connector 20 may be engaged on the clutch control shaft 41 connected with the operating lever 60 by the wire 70, and the third adjusting assembly 53 fixed to the seat connector 20 and the fourth adjusting assembly 57 fixed to the frame connector 10 may be engaged.

As shown in FIG. 5, as a user operates the operating lever 60 to adjust the angle of the seat 350, the wire 70 connected with the operating lever 60 may be pulled and the clutch control shaft 41 may disengage the first adjusting assembly 33 from the second adjusting assembly 37 and the third adjusting assembly 53 from the fourth adjusting assembly 57 such that the seat connector 20 supporting the seat 350 may rotate with respect to the frame 10.

In other words, as the operating lever 60 is operated, the clutch control shaft 41 fixed to the wire 70 may move backward, and the second adjusting assembly 37 and the fourth adjusting assembly 57, which are fixed to the clutch control shaft 41, are spaced, such that the first adjusting assembly 33 and the second adjusting assembly 37 may be disengaged and the third adjusting assembly 53 and the fourth adjusting assembly 57 may be disengaged. As a result, the second adjusting assembly 37 and the fourth adjusting assembly 53, which are fixed to the seat connector 20, may be disengaged with respect to the first adjusting assembly 33 and the fourth adjusting assembly 57, which are fixed to the frame connector 10, such that the seat connector 20 may become rotatable with respect to the frame connector 10.

In this position, the user may adjust the angle of the seat 350 and may also adjust the angle even on the seat 350, and thus, it is possible to adjust the angle of the seat 350 while the bicycle is in motion.

Next, as shown in FIG. 6, the angle of the seat connector 20 is fixed with respect to the frame connector 10 by operating the operating lever 60 in the opposite way, after the angle adjustment of the seat 350 is finished, in which the wire 70 is pushed, the clutch control shaft 41 connected to the wire 70 may return forward, and the first adjusting assembly 33, the second adjusting assembly 37, the third adjusting assembly 53, and the fourth adjusting assembly 57 may be engaged, respectively. In this operation, the elastic member 61 between the second adjusting assembly 37 and the fourth adjusting assembly 57 may help the clutch control shaft 41 return by providing elastic force.

Figure 7:
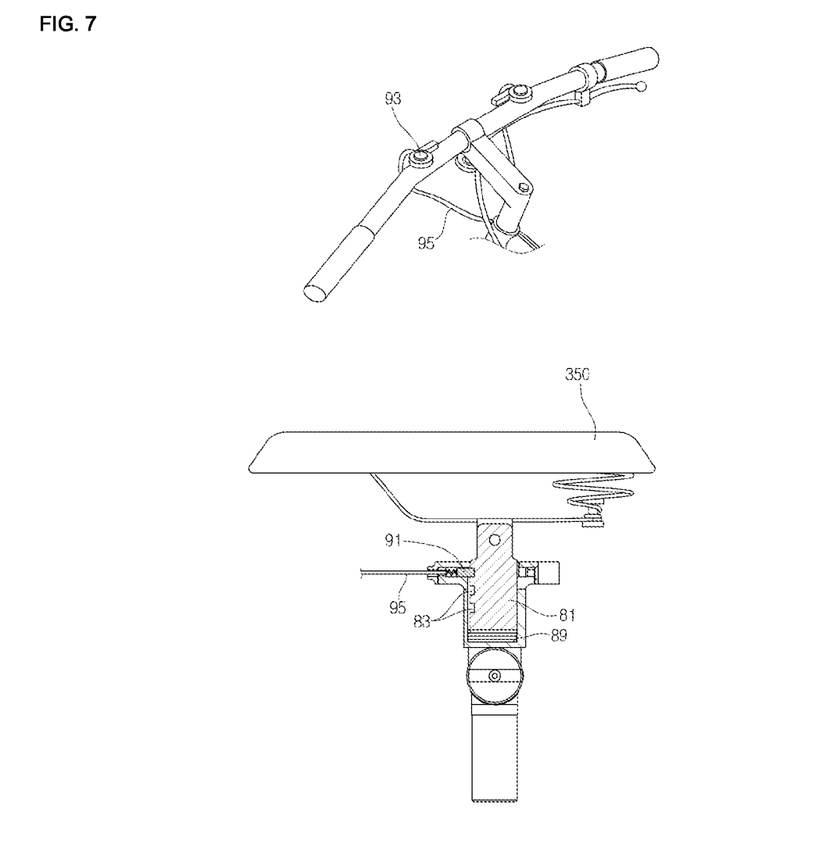
FIGS. 7 to 9 are views the height adjustment operation of the angle adjuster for a bicycle seat according to the first embodiment of the present invention.
Figure 8:
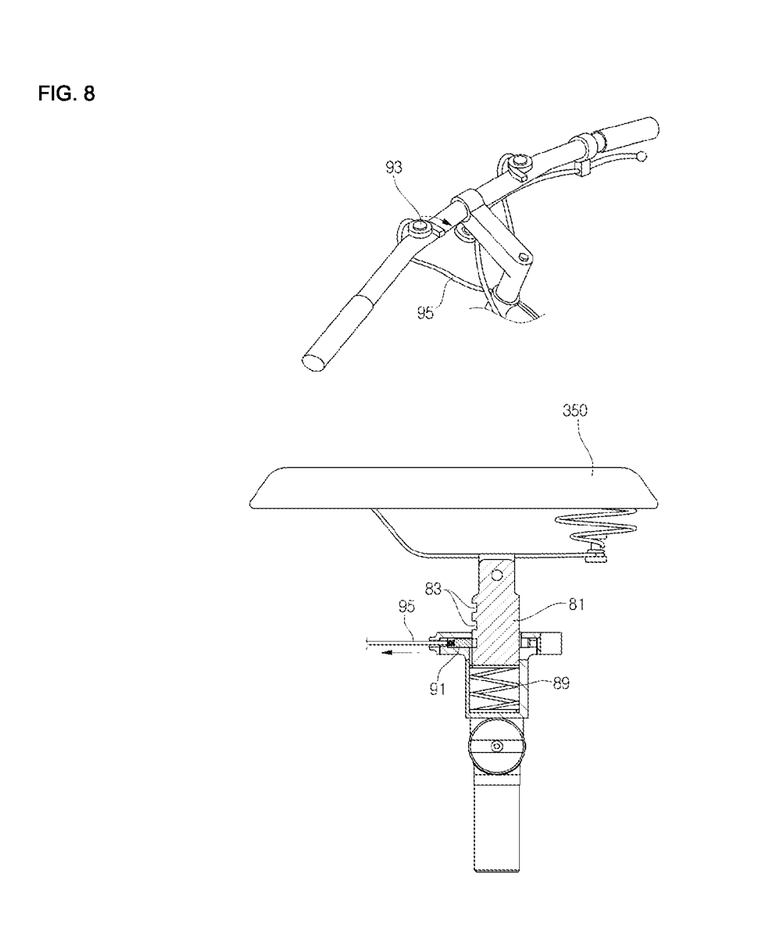
Figure 9:
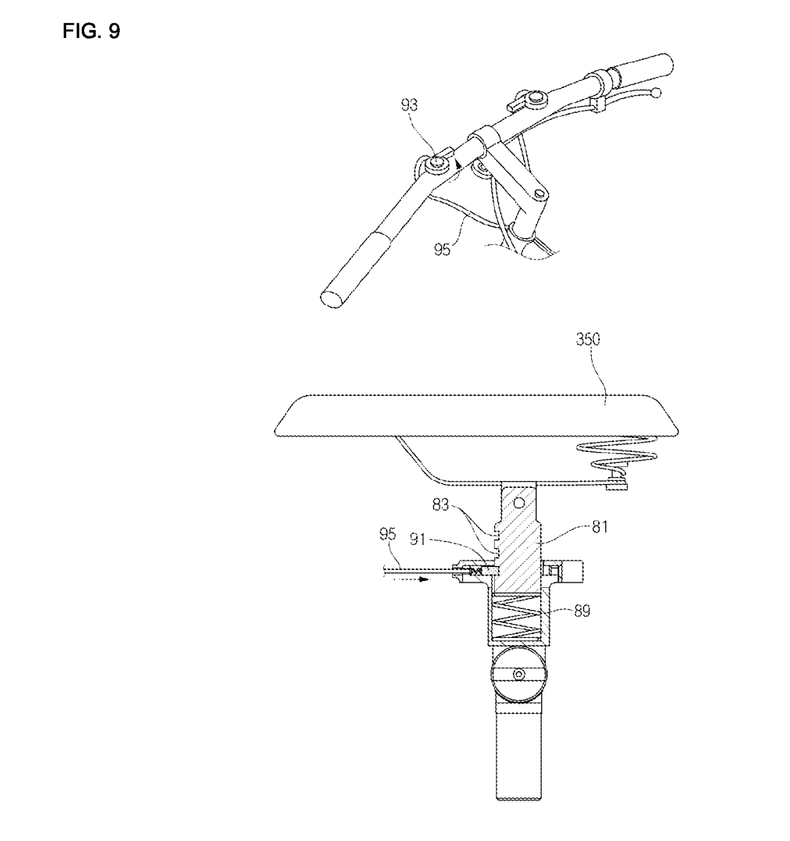

FIGS. 7 to 9 are views the height adjustment operation of the angle adjuster for a bicycle seat according to the first embodiment of the present invention.

As shown in FIG. 7, the locking member 91 is locked in the uppermost locking groove 83 in the locking grooves 83 of the seat support shaft 81 and may fix the height of the seat 350, when the sub-operating lever 93 is not operated by the user.

As shown in FIG. 8, as the user operates the sub-operating lever 93 to adjust the height of the seat 350, the sub-wire 95 connected with the sub-operating lever 93 may be pulled and the locking member 91 may be separated from the locking groove 83 of the seat support shaft 81 supporting the seat 350 and the support spring 89 may lift the seat support shaft 81.

In this position, the user may adjust the height of the seat 350 and may also adjust the height even on the seat 350, and thus, it is possible to adjust the height of the seat 350 while the bicycle is in motion.

Next, as shown in FIG. 9, the height of the seat 350 may be fixed by operating the sub-operating lever 93 in the opposite way, after the height adjustment of the seat 350 is finished, in which the sub-wire 95 may be pushed and the locking member 91 connected to the sub-wire 95 may be locked in any one of the locking grooves 83 of the seat support shaft 81.

The configuration and operation of an angle adjuster for a bicycle seat according to a second embodiment of the present invention is described hereafter.

Figure 10:
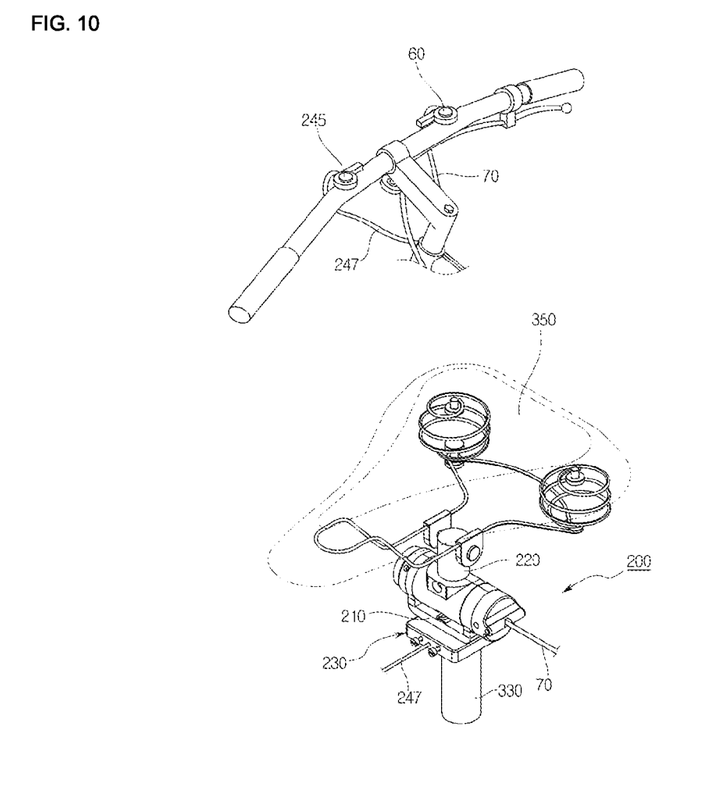
FIG. 10 is a perspective view illustrating the configuration of an angle adjuster for a bicycle seat according to a second embodiment of the present invention.
Figure 11:
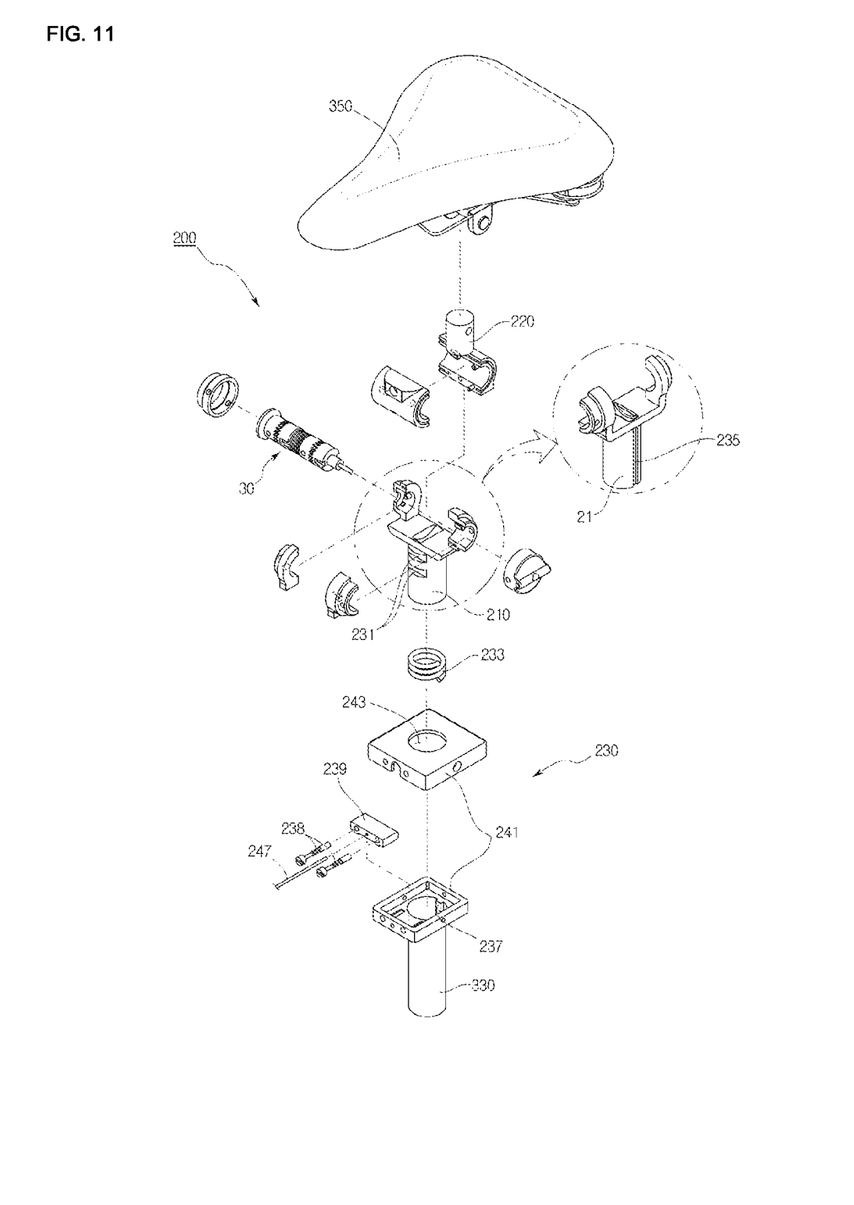
FIG. 11 is an exploded perspective view illustrating the configuration of the angle adjuster for a bicycle seat according to the second embodiment of the present invention.

FIG. 10 is a perspective view illustrating the configuration of an angle adjuster for a bicycle seat according to a second embodiment of the present invention. FIG. 11 is an exploded perspective view illustrating the configuration of the angle adjuster for a bicycle seat according to the second embodiment of the present invention.

Referring to FIGS. 10 and 11, an angle adjuster for a bicycle seat 200 according to the second embodiment of the present invention may include a frame connector 210, a seat connector 220, an angle adjusting assembly 30, an operating lever 60, and a wire 70, which may have the same configuration and operation as in the angle adjuster for a bicycle seat 100 according to the first embodiment of the present invention, and a height adjusting assembly 240 may be mounted on the frame 330 of the bicycle and the frame connector 210.

The lower end portion of the body of the frame connector 210 may be received in the frame 330 of the bicycle 330, elastically supported by a support spring 233 disposed in the frame 330, and reciprocated by the height adjusting assembly 230, thereby adjusting the height.

The seat connector 220 is disposed rotatably on the frame connector 210 while supporting the seat 350, and the rotational angle of adjusted by the operation of the angle adjusting assembly 30. That is, as a user operates the operating lever 60 and the wire 70 may be pulled, the angle adjusting assembly 30 connected to the wire 70 may be operated, such that the rotational angle of the seat connector 220 may be adjusted.

The height adjusting assembly 230 may be composed of a plurality of locking grooves 231 formed in the longitudinal direction of the frame connector 210 and received in the frame 330 of the bicycle, a support spring 233 elastically supporting the frame connector 210 such that the frame connector 210 is spaced apart from the frame 330 of the bicycle, a locking member 239 selectively locked in the locking grooves 231 of the frame 330 to control the height of the frame connector 210 with respect to the frame 330 of the bicycle, a sub-operating lever 245 mounted on the frame 330 of the bicycle to operate the locking member 239, and a sub-wire 237 connecting the locking member 239 with the sub-operating lever 245 and operating the locking member 239, when the sub-operating lever 245 may be operated. In this configuration, a case 241 that receives the locking member 239 may be disposed at the upper end of the frame 330 and the frame connector 239 may be inserted through a through-hole 234 formed through the case 241.

In this configuration, a guide rail 237 may be vertically formed inside the frame 330 where the frame connector 210 is received and a rail groove 235 corresponding to the guide rail 237 may also be formed on the frame connector 210, such that they may be combined. That is, the frame connector 210 may ascend/descend in a predetermined direction along the guide rail 237 of the frame 330 which may be fitted in the rail groove 235.

According to the configuration described above, since the support spring 233 may support the frame connector 210 in the frame 330 of the bicycle where the frame connector 210 is connected and the locking member 239 disposed in the case 241 may be locked in the locking groove 231 of the frame connector 210, the height of the frame connector 210 may be fixed. In this configuration, it may be possible to adjust the height of the frame connector 210 with respect to the frame 330 of the bicycle by operating the sub-operating lever 245, in which the locking groove 239 connected to the sub-wire 247 may move forward or backward such that the locking member 239 may be selectively locked in the locking grooves 231 of the frame connector 210.

Further, a sub-elastic member 238 may be disposed between the locking member 239 and the case 241 of the frame connector 210 to provide elastic force such that the locking member 239 may be locked in any one of the locking grooves 231 of the frame connector 210.

As described above, an angle adjuster for a bicycle seat according to an embodiment of the present invention makes it possible to adjust angle of the seat to fit the body shapes of users such that they may ride the bicycle in a comfortable position. Further, it is possible to prevent an accident by appropriately adjusting angle of the seat such that the user's body is not inclined in one direction, when going up or coming down a slope. In particular, it is possible for the users to freely adjust the angle and height of the seat by operating the operating lever while the bicycle is in motion, thereby providing the users with convenience.

Although embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An angle adjuster for a bicycle seat that is configured to be installed between a frame of a bicycle and a seat, the angle adjuster comprising:

a frame connector configured to be connected to the frame;

a seat connector rotatably connected to the upper end of the frame connector and configured to support the seat;

an angle adjusting assembly including a main clutch fixing and releasing the frame connector and the seat connector, and controlling rotational angle of the seat connector with respect to the frame connector by the release operation of the main clutch;

an operating lever configured to mount on the frame to operate the main clutch; and a wire connecting the main clutch with the operating lever and operating the main clutch, when the operating lever is operated, wherein the angle adjusting assembly includes:

the main clutch including a first adjusting member that has a plurality of first teeth at one side and is fixed to the frame connector and a second adjusting member that has a plurality of second teeth configured to engage with the first teeth of the first adjusting member and is fixed to the seat connector;

a clutch control shaft that is fixed to any one of the first adjusting member and the second adjusting member and connected to the wire to engage or disengage the first adjusting member and the second adjusting member, when the operating lever is operated; and a sub-clutch including a third adjusting member that has a plurality of third teeth and is fixed to the seat connector and a fourth adjusting member that has a plurality of fourth teeth configured to engage with the third teeth of the third adjusting member and is fixed to the frame connector, wherein any one of the third adjusting member and the fourth adjusting member of the sub-clutch is fixed to the clutch control shaft, and the third adjusting member and the fourth adjusting member are controlled to be engaged or disengaged by the clutch control shaft.

2. The angle adjuster for a bicycle seat according to claim 1, further comprising an elastic member disposed between the main clutch and the sub-clutch to provide elastic force such that the first adjusting member and the second adjusting member, and the third adjusting member and the fourth adjusting member are engaged with each other.

3. The angle adjuster for a bicycle seat according to claim 1, further comprising:

a seat support shaft configured to support the seat, reciprocating in the seat connector, and having a plurality of locking grooves formed in the longitudinal direction of the shaft;

a support spring configured to elastically support the seat support shaft such that the seat is spaced apart from the seat connector;

a locking member selectively locked in the locking grooves to control height of the seat support shaft;

a sub-operating lever configured to be mounted on the frame operating the locking member; and a sub-wire connecting the locking member with the sub-operating lever and operating the locking member, when the sub-operating lever is operated.

4. The angle adjuster for a bicycle seat according to claim 3, further comprising a sub-elastic member disposed between the seat connector and the locking member to provide elastic force such that the locking member is locked in any one of the locking grooves.

5. The angle adjuster for a bicycle seat according to claim 1, further comprising:

a plurality of locking grooves formed in the longitudinal direction of the frame connector and configured to be received in the frame;

a support spring configured to elastically support the frame connector such that the frame connector is spaced apart from the frame;

a locking member configured to be selectively locked in the locking grooves to control height of the frame connector with respect to the frame;

a sub-operating lever configured to be mounted on the frame operating the locking member; and a sub-wire connecting the locking member with the sub-operating lever and operating the locking member, when the sub-operating lever is operated.

6. The angle adjuster for a bicycle seat according to claim 5, further comprising a sub-elastic member configured to be disposed between the frame and the locking member to provide elastic force such that the locking member is locked in any one of the locking grooves.

* * * * *